United States Patent
Bhoja et al.

(10) Patent No.: US 8,761,598 B2
(45) Date of Patent: Jun. 24, 2014

(54) METHOD AND SYSTEM FOR ADAPTIVELY SETTING A TRANSMITTER FILTER FOR A HIGH SPEED SERIAL LINK TRANSMITTER

(75) Inventors: Sudeep Bhoja, San Jose, CA (US); Ali Ghiasi, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 554 days.

(21) Appl. No.: 13/076,558

(22) Filed: Mar. 31, 2011

(65) Prior Publication Data

US 2011/0249967 A1  Oct. 13, 2011

Related U.S. Application Data

(60) Provisional application No. 61/322,185, filed on Apr. 8, 2010.

(51) Int. Cl.
*H04B 10/08* (2006.01)

(52) U.S. Cl.
USPC .................. 398/25; 398/30; 398/32; 398/33; 398/135

(58) Field of Classification Search
CPC ............. H04B 10/077; H04B 10/0775; H04B 107/079; H04B 10/0795; H04B 10/40; H04B 10/43
USPC ............. 398/135–139, 25, 26, 27, 30, 32, 33
See application file for complete search history.

(56) References Cited

U.S. PATENT DOCUMENTS

| | | | | |
|---|---|---|---|---|
| 4,757,553 A * | 7/1988 | Crimmins | ...................... | 398/129 |
| 6,898,379 B2 * | 5/2005 | Lenosky et al. | ............... | 398/149 |
| 7,526,211 B2 * | 4/2009 | Mcnicol et al. | ............... | 398/135 |
| 8,331,801 B2 * | 12/2012 | Dong | ............................. | 398/202 |
| 8,606,103 B2 * | 12/2013 | Friedrich | ........................ | 398/33 |
| 2001/0019436 A1 * | 9/2001 | Nakajima et al. | .............. | 359/110 |
| 2005/0123301 A1 * | 6/2005 | Kallstenius | ................... | 398/115 |
| 2006/0002711 A1 * | 1/2006 | Ekkizology et al. | .......... | 398/135 |
| 2006/0128326 A1 * | 6/2006 | Pietraski | ........................ | 455/130 |
| 2006/0245757 A1 * | 11/2006 | Elahmadi et al. | ............. | 398/135 |
| 2007/0104490 A1 * | 5/2007 | Ghiasi | ............................ | 398/159 |
| 2007/0127920 A1 * | 6/2007 | Ghiasi et al. | ..................... | 398/25 |
| 2010/0028015 A1 * | 2/2010 | Hosking | ........................ | 398/135 |

* cited by examiner

*Primary Examiner* — Daniel Washburn
*Assistant Examiner* — Hibret Woldekidan
(74) *Attorney, Agent, or Firm* — Oblon, Spivak, McClelland, Maier & Neustadt, L.L.P.

(57) ABSTRACT

A communication device may be operable to determine, in an optical module, a signal quality associated with each of one or more host transmitter filters in a host circuit. The signal quality may be communicated from the optical module to the host circuit via a management interface. The communication device may control, in the host circuit, configuration of each of the host transmitter filters based on the signal quality. The communication device may be operable to determine, in the host circuit, a signal quality associated with each of one or more module transmitter filters in the optical module. The signal quality associated with each of the module transmitter filters may be communicated from the host circuit to the optical module via the management interface. The communication device may control, in the optical module, configuration of each of the module transmitter filters based on the signal quality.

20 Claims, 5 Drawing Sheets

US 8,761,598 B2

METHOD AND SYSTEM FOR ADAPTIVELY SETTING A TRANSMITTER FILTER FOR A HIGH SPEED SERIAL LINK TRANSMITTER

CROSS-REFERENCE TO RELATED APPLICATIONS/INCORPORATION BY REFERENCE

This patent application makes reference to, claims priority to, and claims benefit from United States Provisional Application Ser. No. 61/322,185, which was filed on Apr. 8, 2010.

This application also makes reference to:
U.S. patent application Ser. No. 10/418,035 filed on Apr. 17, 2003, issued as U.S. Pat. No. 7,321,612 on Jan. 22, 2008; and
U.S. patent application Ser. No. 11/268,246 filed on Nov. 7, 2005, issued as U.S. Pat. No. 7,676,158 on Mar. 9, 2010.

Each of the above stated applications is hereby incorporated herein by reference in its entirety.

FIELD OF THE INVENTION

Certain embodiments of the invention relate to communication systems. More specifically, certain embodiments of the invention relate to a method and system for adaptively setting a transmitter filter for a high speed serial link transmitter.

BACKGROUND OF THE INVENTION

High speed fiber optical systems may be used in various communication applications, for instance in telecommunication over long transmission distances. A telecommunication network may be classified into various levels such as subscriber networks, regional networks and national networks. The national networks, for example, may exist between different cities where there is a greater demand for higher transmission speeds above 10 gigabits/sec such as, for example, 25 gigabits/sec, 40 gigabits/sec or 100 gigabits/sec. In the national networks, for example, dispersion may limit the transmission speeds between transmitters and receivers. Optical dispersion is a fundamental problem for high-speed gigabit networks and is of particular importance as bit rates exceed 2.4 gigabits/sec, for example. In high volume 10 GbE ports based on, for example, a form-factor pluggable architecture, the settings of a pre-emphasis filter may be manually configured.

Intersymbol interference (ISI) may occur in digital communications in bandwidth-limited links. The main source of ISI in a fiber-optic system is signal pulse broadening due to fiber dispersion. There may be various types of dispersion in a fiber-optic system, which may comprise modal dispersion, chromatic dispersion and polarization mode dispersion, for example. In a multimode fiber, different mode groups have different velocities, which may be called modal dispersion. Chromatic dispersion may be caused by different wavelengths of light having different velocities. The polarization mode dispersion, which may be due to different velocities of different polarizations, may be neglected in multimode fibers. Dispersion is usually time varying due to environmental change such as temperature variation and is related to fiber length and/or bit rates. For example, a printed circuit board (PCB) trace loss for a 25-gigabit (Gb) signaling may be twice of that for a 10-gigabit (Gb) signaling. Higher PCB trace loss may introduce more dispersion variations.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for adaptively setting a transmitter filter for a high speed serial link transmitter, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for adaptively setting a transmitter filter for a high speed serial link transmitter. In various embodiments of the invention, a communication device, which may comprise a host circuit and an optical module, may be operable to determine, in the optical module, a signal quality associated with each of one or more host transmitter filters in the host circuit. The determined signal quality may be communicated from the optical module to the host circuit via a management interface. The communication device may be operable to control, in the host circuit, setting or configuration of each of the one or more host transmitter filters based on the determined signal quality. In this regard, the management interface may comprise, for example, a management data input/output (MDIO) interface and/or an inter-integrated circuit ($I^2C$) interface. Each of the one or more host transmitter filters may comprise a pre-emphasis filter, for example.

In an exemplary embodiment of the invention, the communication device may be operable to limit, in the optical module, a signal received from each of the one or more host transmitter filters. The limited signal and the signal may be compared in the optical module. An error associated with the signal may be generated in the optical module based on the comparison. The generated error may be squared by the communication device in the optical module. The communication device may be operable to generate, in the optical module, a mean square error (MSE) by low-pass filtering the squared error. In this regard, the communication device may determine, in the optical module, the signal quality based on the generated mean square error (MSE), for example.

The communication device may also be operable to determine, in the host circuit, a signal quality associated with each of one or more module transmitter filters in the optical module. The determined signal quality associated with each of the one or more module transmitter filters may be communicated from the host circuit to the optical module via the management interface. The communication device may be operable to control, in the optical module, setting or configuration of each of the one or more module transmitter filters based on the determined signal quality associated with each of the one or more module transmitter filters. In this regard, each of the one or more module transmitter filters may comprise, for example, a de-emphasis filter. The signal quality associated with each of the one or more module transmitter filters may be determined by the communication device, in the host circuit, based on a signal-to-noise ratio (SNR) associated with a signal received from each of the one or more module transmitter filters, for example.

Figure 1:
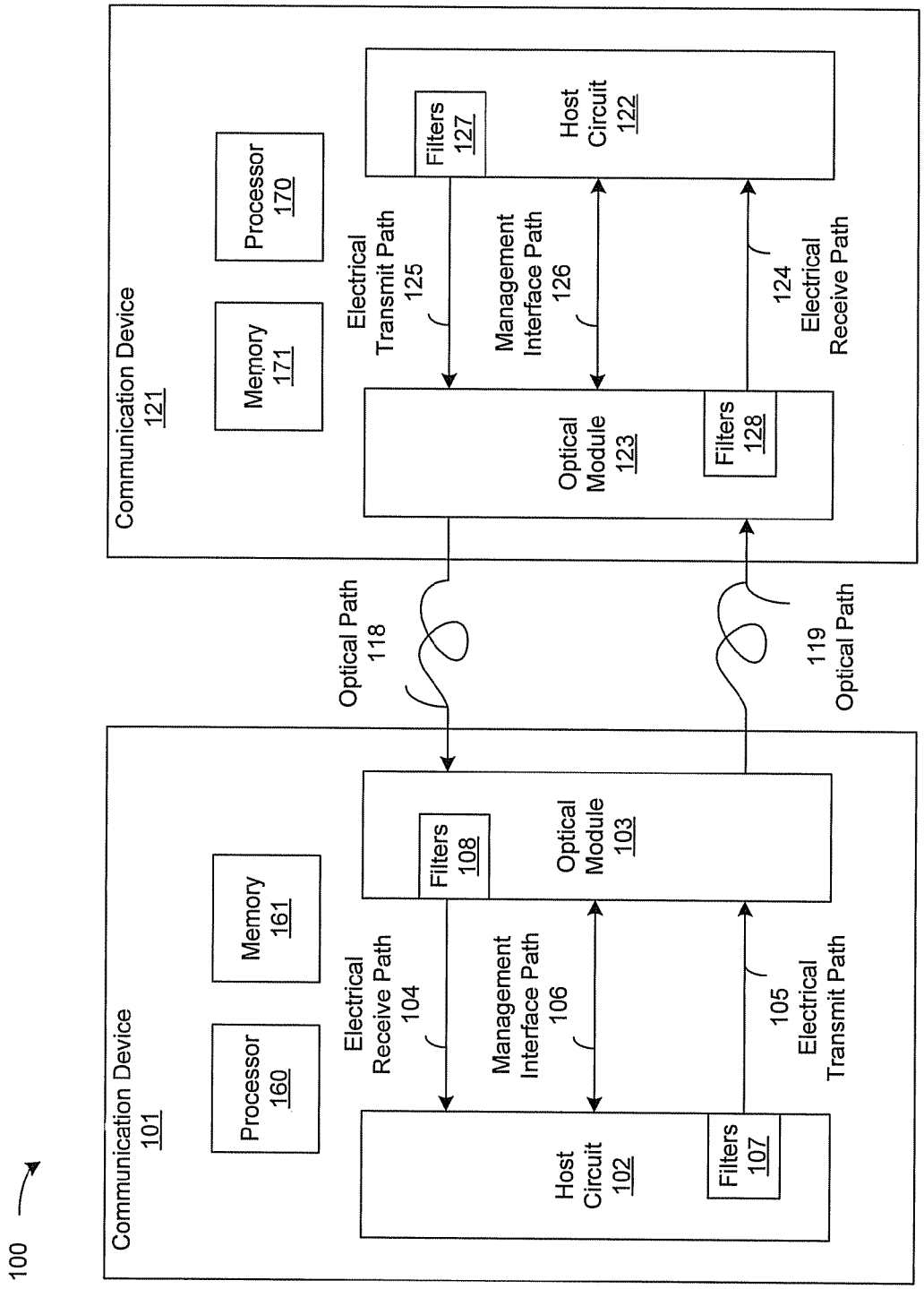
FIG. 1 is a block diagram illustrating an exemplary communication system that is operable to adaptively set a transmitter filter for a high speed serial link transmitter, in accordance with an embodiment of the invention.

FIG. 1 is a block diagram illustrating an exemplary communication system that is operable to adaptively set a transmitter filter for a high speed serial link transmitter, in accordance with an embodiment of the invention. Referring to FIG. 1, there is shown a communication system 100. The communication system 100 may comprise a communication device 101 and a communication device 121. The communication device 101 and the communication device 121 may be communicatively coupled via optical paths 118, 119.

The communication device 101 may comprise a host circuit 102, an optical module 103, a processor 160 and a memory 161. The communication device 101 may comprise, for example, an application-specific integrated circuit (ASIC). The host circuit 102 may comprise one or more host transmitter filters 107. The optical module 103 may comprise one or more module transmitter filters 108. The host circuit 102 and the optical module 103 may be communicatively coupled via an electrical transmit path 105, an electrical receive path 104 and a management interface path 106. The electrical transmit path 105 and/or the electrical receive path 104 may utilize, for example, a 40 GbE attachment unit interface (XLAUI) or a 100 GbE attachment unit interface (CAUI). The management interface path 106 may utilize a management interface such as, for example, a MDIO interface or an I²C interface. The management interface may be utilized by the host circuit 102 to control and/or monitor various operations of the optical module 103.

The host circuit 102 may comprise suitable logic, circuitry, interfaces and/or code that may be operable to generate output signals to the optical module 103 via the electrical transmit path 105. The host circuit 102 may be operable to receive input signals from the optical module 103 via the electrical receive path 104. The host circuit 102 may communicate with the optical module 103 via the management interface path 106 for control and/or monitoring operations.

In an exemplary embodiment of the invention, the host circuit 102 may be operable to determine a signal quality associated with a signal received from the optical module 103 via the electrical receive path 104. The received signal may be an output signal of one of the one or more module transmitter filters 108 in the optical module 103. The determined signal quality may be communicated from the host circuit 102 to the optical module 103 via the management interface path 106 for controlling setting or configuration of the one of the one or more module transmitter filters 108 in the optical module 103.

The optical module 103 may comprise suitable logic, circuitry, interfaces and/or code that may be operable to receive input signals from the host circuit 102 via the electrical transmit path 105. The optical module 103 may be operable to generate output signals to the host circuit 102 via the electrical receive path 104. The optical module 103 may generate optical signals to an optical module 123 in the communication device 121 via the optical path 119. The optical module 103 may receive optical signals from the optical module 123 in the communication device 121 via the optical path 118. The optical module 103 may communicate with the host circuit 102 via the management interface path 106 for control and/or monitoring operations. The optical module 103 may comprise, for example, a 100-Gb form-factor pluggable (CFP) module or a quad small form-factor pluggable (QSFP) module.

In an exemplary embodiment of the invention, the optical module 103 may be operable to determine a signal quality associated with a signal received from the host circuit 102 via the electrical transmit path 105. The received signal may be an output signal of one of the one or more host transmitter filters 107 in the host circuit 102. The determined signal quality may be communicated from the optical module 103 to the host circuit 102 via the management interface path 106 for controlling setting or configuration of the one of the one or more host transmitter filters 107 in the host circuit 102.

The processor 160 may comprise suitable logic, circuitry, interfaces and/or code that may be operable to coordinate operation of various components of the communication device 101. The processor 160 may control communication of information and signals between components of the communication device 101. The processor 160 may execute code stored in the memory 161.

The memory 161 may comprise suitable logic, circuitry, interfaces and/or code that may be operable to store information such as executable instructions, data and/or database that may be utilized by the processor 160. The memory 161 may comprise, for example, DRAM, SRAM, flash memory, a hard drive or other magnetic storage, and/or any other suitable electronic data storage.

The communication device 121 may comprise a host circuit 122, an optical module 123, a processor 170 and a memory 171. The host circuit 122 may comprise one or more host transmitter filters 127. The optical module 123 may comprise one or more module transmitter filters 128. The host circuit 122 may be substantially similar to the host circuit 102 in the communication device 101. The one or more transmitter filters 127 may be substantially similar to the one or more host transmitter filters 107 in the host circuit 102. The optical module 123 may be substantially similar to the optical module 103 in the communication device 101. The one or more module transmitter filters 128 may be substantially similar to the one or more module transmitter filters 108 in the optical module 103. The processor 170 may be substantially similar to the processor 160 in the communication device 101. The memory 171 may be substantially similar to the memory 161 in the communication device 101.

In operation, a communication device such as the communication device 101 may be operable to determine, in the optical module 103, a signal quality associated with each of the one or more host transmitter, filters 107 in the host circuit 102. The determined signal quality may be communicated from the optical module 103 to the host circuit 102 via the management interface path 106. The communication device 101 may be operable to control, in the host circuit 102, setting or configuration of each of the one or more host transmitter filters 107 based on the determined signal quality.

The communication device 101 may also be operable to determine, in the host circuit 102, a signal quality associated with each of the one or more module transmitter filters 108 in the optical module 103. The determined signal quality associated with each of the one or more module transmitter filters 108 may be communicated from the host circuit 102 to the optical module 103 via the management interface path 106. The communication device 101 may be operable to control, in the optical module 103, setting or configuration of each of the one or more module transmitter filters 108 based on the determined signal quality associated with each of the one or more module transmitter filters 108.

Figure 2:
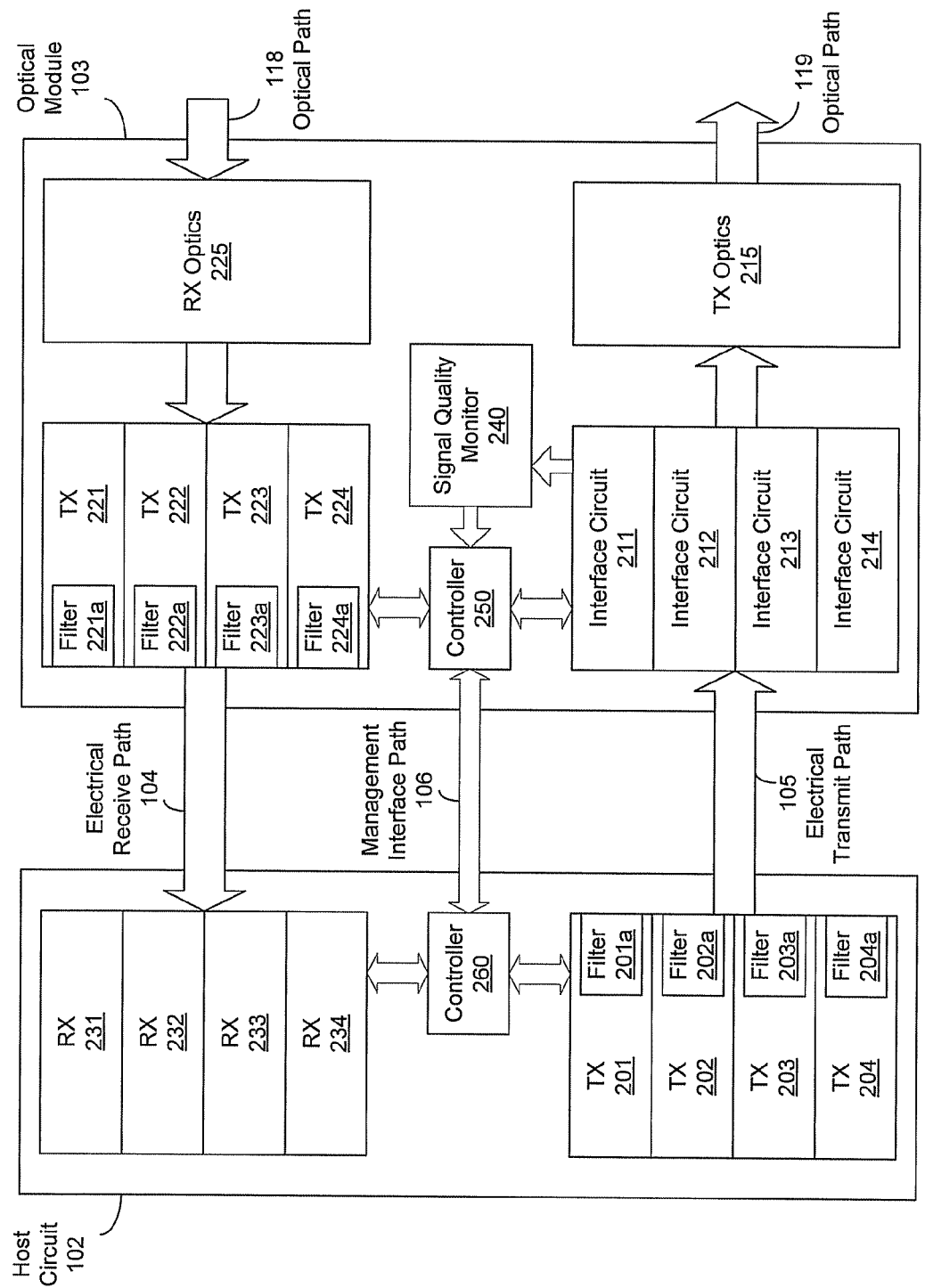
FIG. 2 is a block diagram illustrating an exemplary optical module architecture that is operable to adaptively set a transmitter filter for a high speed serial link transmitter, in accordance with an embodiment of the invention.

FIG. 2 is a block diagram illustrating an exemplary optical module architecture that is operable to adaptively set a transmitter filter for a high speed serial link transmitter, in accordance with an embodiment of the invention. Referring to FIG. 2, there is shown the host circuit 102, the optical module 103, the electrical transmit path 105, the electrical receive path 104, the management interface path 106, the optical path 118 and the optical path 119 described above with respect to FIG. 1.

The host circuit 102 may comprise a plurality of transmitters (TX), of which transmitters 201-204 are illustrated, a plurality of receivers (RX), of which receivers 231-234 are illustrated, and a controller 260. The transmitter 201 may comprise a host transmitter filter 201a. The transmitter 202 may comprise a host transmitter filter 202a. The transmitter 203 may comprise a host transmitter filter 203a. The transmitter 204 may comprise a host transmitter filter 204a. The host transmitter filters 201a-204a may be substantially similar to the host transmitter filters 107 in FIG. 1.

The optical module 103 may comprise a plurality of transmitters (TX), of which transmitters 221-224 are illustrated, a plurality of interface circuits, of which interface circuits 211-214 are illustrated, a transmitter (TX) optics block 215, a receiver (RX) optics block 225, a controller 250 and a signal quality monitor 240. The transmitter 221 may comprise a module transmitter filter 221a. The transmitter 222 may comprise a module transmitter filter 222a. The transmitter 223 may comprise a module transmitter filter 223a. The transmitter 224 may comprise a module transmitter filter 224a. The module transmitter filters 221a-224a may be substantially similar to the module transmitter filters 108 in FIG. 1.

Each of the transmitters 201-204 in the host circuit 102 such as the transmitter 201 may comprise suitable logic, circuitry, interfaces and/or code that may be operable to transmit serial signals to each of the interface circuits 211-212 such as the interface circuit 211 in the optical module 103. Each of the host transmitter filters 201a-204a such as the host transmitter filter 201a in the transmitter 201 may be operable to provide filtering or equalization for the transmitter 201. For example, the host transmitter filter 201a may comprise a pre-emphasis filter with one or more taps. Each tap coefficient may be tuned or set to provide pre-emphasis. In an exemplary embodiment of the invention, the setting of the tap coefficient(s) for the host transmitter filter 201a may be based on a signal quality associated with the host transmitter filter 201a. The signal quality may be determined by the controller 250 in the optical module 130 based on error information such as, for example, a mean square error (MSE) associated with the host transmitter filter 201a. The error information such as the MSE may be generated by the signal quality monitor 240. The determined signal quality may be received by the controller 260 from the controller 250 in the optical module 103 via the management interface path 106. The setting of the tap coefficient(s) may be controlled by the controller 260 based on the determined signal quality.

Each of the receivers 231-234 in the host circuit 102 such as the receiver 231 may comprise suitable logic, circuitry, interfaces and/or code that may be operable to receive serial signals from each of the transmitters 221-224 such as the transmitter 221 in the optical module 103. In an exemplary embodiment of the invention, the receiver 231 may be operable to generate error information such as, for example, a signal-to-noise ratio (SNR) associated with the module transmitter filter 221a in the transmitter 221. In this regard, the error information such as the SNR may be communicated to the controller 260. A signal quality associated with the module transmitter filter 221a may be determined by the controller 260 based on the error information such as the SNR. The determined signal quality may be communicated from the controller 260 to the controller 250 in the optical module 103, via the management interface path 106, for controlling setting or configuration of the module transmitter filter 221a.

The controller 260 in the host circuit 102 may comprise suitable logic, circuitry, interfaces and/or code that may be operable to provide various control and/or monitoring functions for the host circuit 102. The controller 260 may comprise, for example a microcontroller. The controller 260 may communicate with the controller 250 in the optical module 103 via the management interface path 106 based on a management interface protocol such as, for example, a MDIO interface protocol and/or an I$^2$C interface protocol. In an exemplary embodiment of the invention, the controller 260 may be operable to control setting or configuration of each of the host transmitter filters 201a-204a such as the host transmitter filter 201a based on the signal quality associated with each of the host transmitter filters 201a-204a such as the host transmitter filter 201a. The signal quality associated with each of the host transmitter filters 201a-204a such as the host transmitter filter 201a may be received by the controller 260 from the controller 250 in the optical module 103, via the management interface path 106.

The controller 260 may also be operable to determine the signal quality associated with each of the module transmitter filters 221a-224a such as the module transmitter filter 221a based on error information such as, for example, the SNR associated with each of the module transmitter filters 221a-224a such as the module transmitter filter 221a. For example, the controller 260 may be operable to set or update a register value which may indicate a level of the signal quality associated with the module transmitter 221a based on the SNR associated with the module transmitter filter 221a. The controller 260 may communicate the determined signal quality associated with each of the module transmitter filters 221a-224a such as the module transmitter filter 221a to the controller 250 in the optical module 103, via the management interface path 106, for controlling setting or configuration of each of the module transmitter filters 221a-224a such as the module transmitter filter 221a.

Each of the transmitters 221-224 in the optical module 103 such as the transmitter 221 may comprise suitable logic, circuitry, interfaces and/or code that may be operable to transmit serial signals to each of the receivers 231-234 such as the receiver 231 in the host circuit 102. Each of the module transmitter filters 221a-224a such as the module transmitter filter 221a in the transmitter 221 may be operable to provide filtering or equalization for the transmitter 201. For example, the module transmitter filter 221a may comprise a de-emphasis filter with one or more taps. Each tap coefficient may be tuned or set to provide de-emphasis. In an exemplary embodiment of the invention, the setting of the tap coefficient(s) for the module transmitter filter 221a may be based on a signal quality associated with the module transmitter filter 221a. The signal quality may be determined by the controller 260 in the host circuit 120 based on error information such as, for example, a signal-to-noise ratio (SNR) associated with the module transmitter filter 221a. The error information such as the SNR may be generated by the receiver 231 in the host circuit 120, for example. The error information such as SNR may be communicated from the receiver 231 to the controller 260 in the host circuit 120. The determined signal quality may be received by the controller 250 from the controller 260 via the management interface path 106. The setting of the tap coefficient(s) may be controlled by the controller 250 based on the determined signal quality.

Each of the interface circuits 211-214 in the optical module 103 such as the interface circuit 211 may comprise suitable logic, circuitry, interfaces and/or code that may be operable to receive serial signals from each of the transmitters 201-204 such as the transmitter 201 in the host circuit 102. Each of the interface circuits 211-214 such as the interface circuit 211 may generate an output signal to the TX optics block 215. Each of the interface circuits 211-214 such as the interface circuit 211 may comprise, for example, an equalizer and/or a clock and data recovery (CDR) circuit.

The controller 250 in the optical module 103 may comprise suitable logic, circuitry, interfaces and/or code that may be operable to provide various control and/or monitoring functions for the optical module 103. The controller 250 may comprise, for example a microcontroller. The controller 250 may communicate with the controller 260 in the host circuit 102 via the management interface path 106 based on a management interface protocol such as, for example, a MDIO interface protocol and/or an I²C interface protocol. In an exemplary embodiment of the invention, the controller 250 may be operable to control setting or configuration of each of the module transmitter filters 221a-224a such as the module transmitter filter 221a based on the signal quality associated with each of the module transmitter filters 221a-244a such as the module transmitter filter 221a. The signal quality associated with each of the module transmitter filters 221a-224a such as the module transmitter filter 221a may be received by the controller 250 from the controller 260 in the host circuit 102, via the management interface path 106.

The controller 250 may also be operable to determine the signal quality associated with each of the host transmitter filters 201a-204a such as the host transmitter filter 201a based on the error information such as, for example, the MSE associated with each of the host transmitter filters 201a-204a such as the host transmitter filter 201a. For example, the controller 250 may be operable to set or update a register value which may indicate a level of the signal quality associated with the host transmitter filter 201a based on the MSE associated with the host transmitter filter 201a. The controller 250 may communicate the determined signal quality associated with each of the host transmitter filters 201a-204a such as the host transmitter filter 201a to the controller 260 in the host circuit 102, via the management interface path 106, for controlling setting or configuration of each of the host transmitter filters 201a-204a such as the host transmitter filter 201a. In this regard, the controller 250 may be operable to receive the error information such as the MSE associated with each of the host transmitter filters 201a-204a from the signal quality monitor 240.

The signal quality monitor 240 in the optical module 103 may comprise suitable logic, circuitry, interfaces and/or code that may be operable to generate the error information such as, for example, the mean square error (MSE) associated with each of the host transmitter filters 201a-204a. The signal quality monitor 240 may receive input signals from the interface circuits 221-214. The signal quality monitor 240 may communicate the generated error information such as the MSE to the controller 250 in the optical module 103. Additional exemplary details of the signal quality monitor 240 are described below with respect to FIG. 3.

The transmitter (TX) optics block 215 may comprise suitable logic, circuitry, interfaces and/or code that may be operable to generate optical signals for communicating via the optical path 119. The TX optics block 215 may receive input signals from the interface circuits 211-214. The TX optics block 215 may comprise, for example, laser diode amplifiers (LDA) and/or lasers.

The receiver (RX) optics block 225 may comprise suitable logic, circuitry, interfaces and/or code that may be operable to receive optical signals via the optical path 118. The RX optics block 225 may generate output signals to the transmitters 221-224. The RX optics block 225 may comprise, for example, transimpedance amplifiers (TIA) and/or limiting amplifiers (LA).

In operation, the controller 250 in the optical module 103 may be operable to determine a signal quality associated with each of the one or more host transmitter filters 201a-204a in the host circuit 102. The determination may be based on error information such as, for example, a mean square error (MSE) associated with each of the one or more host transmitter filters 201a-204a. The error information such as the MSE may be generated by the signal quality monitor 240 in the optical module 130, for example. The determined signal quality may be communicated from the controller 250 in the optical module 103 to the controller 260 in the host circuit 102 via the management interface path 106. The controller 260 in the host circuit 102 may be operable to control setting or configuration of each of the one or more host transmitter filters 201a-204a based on the determined signal quality. In this regard, the management interface may comprise, for example, a MDIO interface and/or an I²C interface. Each of the one or more host transmitter filters 201a-204a may comprise, for example, a pre-emphasis filter with one or more taps. The controller 260 may control the setting of each tap coefficient associated with each of the host transmitter filters 201a-204a adaptively or dynamically, for example.

The controller 260 in the host circuit 102 may be operable to determine a signal quality associated with each of the one or more module transmitter filters 221a-224a in the optical module 103. The determination may be based on error information such as, for example, a signal-to-noise ratio (SNR) associated with each of the one or more host transmitter filters 221a-224a. The error information such as the SNR associated with each of the one or more module transmitter filters 221a-224a may be generated by each of the one or more receivers 231-234 in the host circuit 102, respectively. The determined signal quality associated with each of the one or more module transmitter filters 221a-224a may be communicated from the controller 260 in the host circuit 102 to the controller 250 in the optical module 103 via the management interface path 106. The controller 250 in the optical module 103 may be operable to control setting or configuration of each of the one or more module transmitter filters 221a-224a based on the determined signal quality associated with each of the one or more module transmitter filters 221a-224a. In this regard, each of the one or more module transmitter filters 221a-224a may comprise, for example, a de-emphasis filter with one or more taps. The controller 250 may control the setting of each tap coefficient associated with each of the one or more module transmitter filters 221a-224a adaptively, for example.

Utilizing the management interface such as the MDIO interface and/or the I²C interface for communicating the signal quality information between the host circuit 102 and the optical module 103, the control of the setting or tuning of each of the one or more host transmitter filters 201a-204a and/or each of the one or more module transmitter filters 221a-224a may be accomplished via an out-of-band signaling mechanism. With the controls of the controllers 250 and 260, each of the one or more host transmitter filters 201a-204a and/or each of the one or more module transmitter filters 221a-224a may be set or tuned automatically to accommodate variations such as, for example, manufacturing variations and/or temperature variations.

In the exemplary embodiment of the invention illustrated in FIG. 2, 4 transmitters 201-204 in the host circuit 102, 4 host transmitter filters 201a-204a, 4 receivers 231-234, 4 transmitters 221-224 in the optical module 103, 4 module transmitter filters 221a-224a and 4 interface circuits 211-214 are shown. Notwithstanding, the invention is not so limited. The number of each of above mentioned components may be different without departing from the spirit and scope of various embodiments of the invention.

Figure 3:
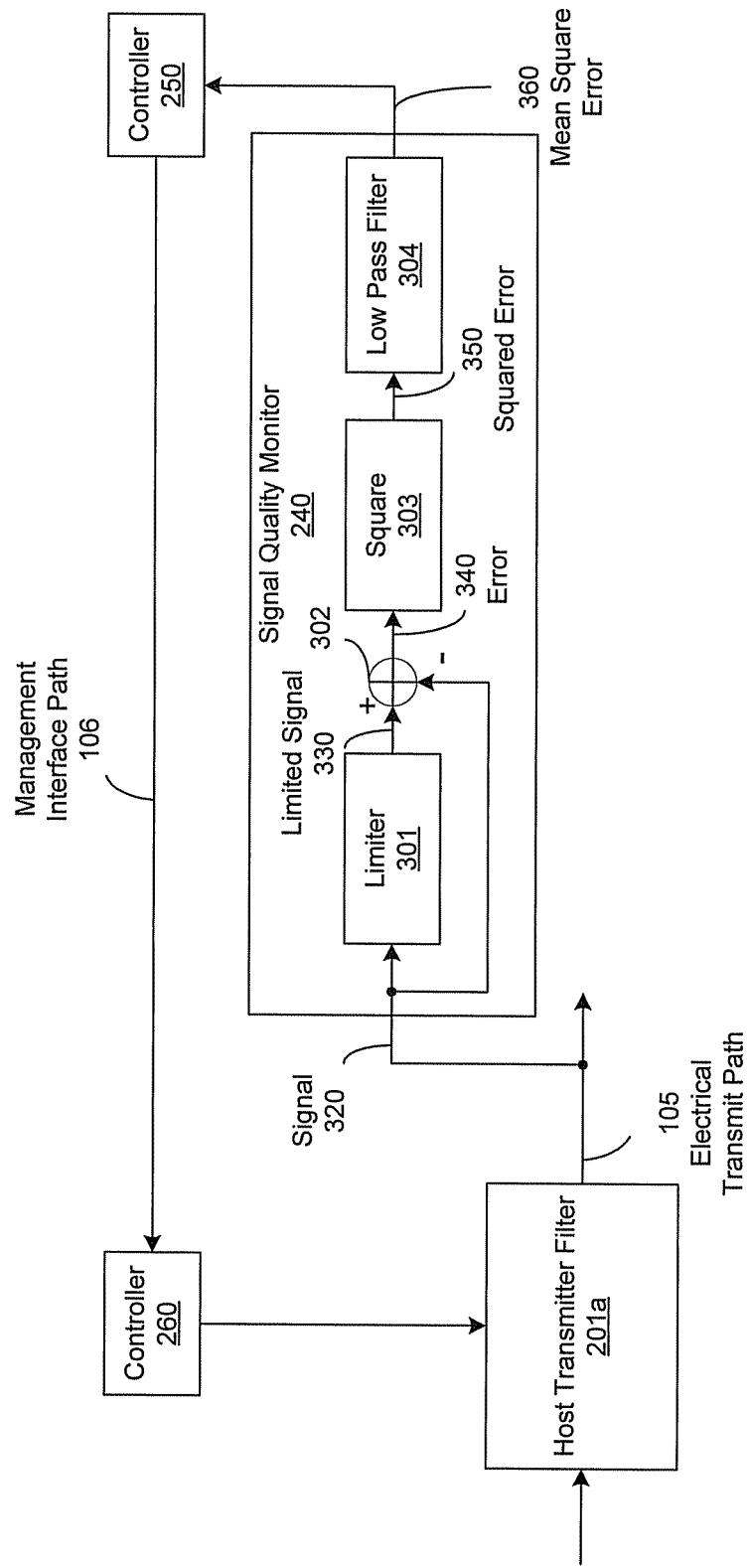
FIG. 3 is a block diagram illustrating an exemplary signal quality monitor in an optical module, in accordance with an embodiment of the invention.

FIG. 3 is a block diagram illustrating an exemplary signal quality monitor in an optical module, in accordance with an embodiment of the invention. Referring to FIG. 3, there is shown the signal quality monitor 240, the controller 250, the controller 260, the host transmitter filter 201a, the electrical transmit path 105 and the management interface path 106 described above with respect to FIG. 2. The signal quality monitor 240 may comprise a limiter 301, a summer 302, a square block 303 and a low pass filter 304.

The limiter 301 may comprise suitable logic, circuitry, interfaces and/or code that may be operable to limit a signal level of a signal 320 received from the host transmitter filter 201 a to generate a limited signal 330.

The summer 302 may comprise suitable logic, circuitry, interfaces and/or code that may be operable to compare the limited signal 330 received from the limiter 301 with the signal 320 so as to generate an error 340. For example, the error 340 may be generated based on measurement of an eye closure in an eye diagram.

The square block 303 may comprise suitable logic, circuitry, interfaces and/or code that may be operable to square the error 340 or perform a square calculation on the error 340 to generate a squared error 350.

The low pass filter 304 may comprise suitable logic, circuitry, interfaces and/or code that may be operable to low-pass filter the squared error 350 so as to generate a mean square error (MSE) 360.

In operation, the limiter 301 in the signal quality monitor 240 may be operable to limit a signal 320 received from a host transmitter filter such as the host transmitter filter 201a, via the electrical transmit path 105. The limited signal 330 and the signal 320 may be compared by the summer 302 in the signal quality monitor 240. An error 340 associated with the signal 320 may be generated by the summer 302 based on the comparison. The generated error 340 may be squared by the square block 303 in the signal quality monitor 240. The low pass filter 304 in the signal quality monitor 240 may be operable to low-pass filter the squared error 350 to generate a mean square error (MSE) 360. In this regard, the controller 250 in the optical module 103 may determine a signal quality associated with the host transmitter filter 301a based on the generated mean square error (MSE) 360. The determined signal quality may be communicated from the controller 250 to the controller 260 in the host circuit 102. The controller 260 may control setting or configuration of the host transmitter filter 201a based on the determined signal quality.

Figure 4:
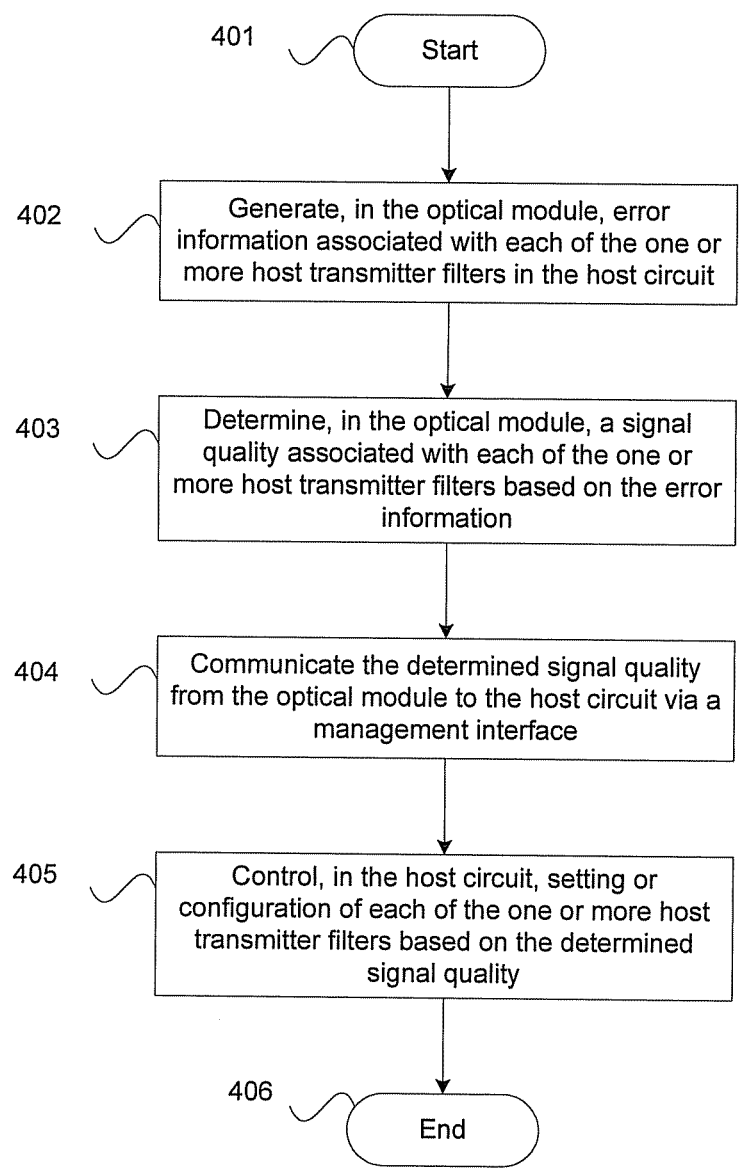
FIG. 4 is a flow chart illustrating exemplary steps for adaptively setting a transmitter filter for a high speed serial link transmitter, in accordance with an embodiment of the invention.

FIG. 4 is a flow chart illustrating exemplary steps for adaptively setting a transmitter filter for a high speed serial link transmitter, in accordance with an embodiment of the invention. Referring to FIG. 4, the exemplary steps start at step 401. In step 402, the signal quality monitor 240 in the optical module 103 of the communication device 101 may be operable to generate error information such as a mean square error (MSE) associated with each of the one or more host transmitter filters 201a-204a in the host circuit 102 of the communication device 101. In step 403, the controller 250 in the optical module 103 may be operable to determine a signal quality associated with each of the one or more host transmitter filters 201a-204a based on the error information such as the MSE. In step 404, the determined signal quality may be communicated from the controller 205 in the optical module 103 to the controller 206 in the host circuit 102 via a management interface such as the management interface path 106. In step 405, the controller 260 in the host circuit 102 may be operable to control setting or configuration of each of the one or more host transmitter filters 201a-204a based on the determined signal quality. The exemplary steps may proceed to the end step 406.

Figure 5:
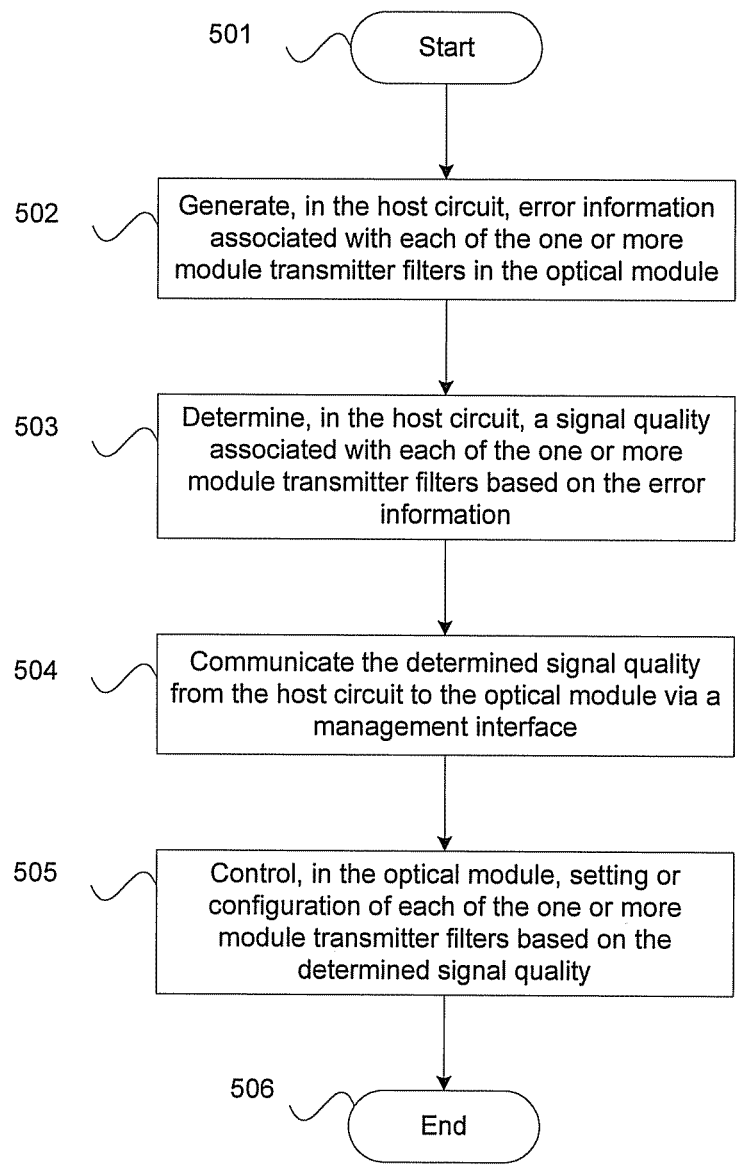
FIG. 5 is a flow chart illustrating exemplary steps for adaptively setting a transmitter filter for a high speed serial link transmitter, in accordance with an embodiment of the invention.

FIG. 5 is a flow chart illustrating exemplary steps for adaptively setting a transmitter filter for a high speed serial link transmitter, in accordance with an embodiment of the invention. Referring to FIG. 5, the exemplary steps start at step 501. In step 502, each of the one or more receivers 231-234 in the host circuit 102 of the communication device 101 may be operable to generate error information such as a signal-to-noise ratio (SNR) associated with each of the one or more module transmitter filters 221a-224a in the optical module 103 of the communication device 101. In step 503, the controller 260 in the host circuit 102 may be operable to determine a signal quality associated with each of the one or more module transmitter filters 221a-224a based on the error information such as the SNR. In step 504, the determined signal quality may be communicated from the controller 206 in the host circuit 102 to the controller 205 in the optical module 103 via a management interface such as the management interface path 106. In step 505, the controller 250 in the optical module 103 may be operable to control setting or configuration of each of the one or more module transmitter filters 221a-224a based on the determined signal quality. The exemplary steps may proceed to the end step 506.

In various embodiments of the invention, a communication device such as the communication device 101 may comprise a host circuit 102 and an optical module 103. A controller 250 in the optical module 103 may be operable to determine a signal quality associated with each of one or more host transmitter filters 201a-204a in the host circuit 102. The determined signal quality may be communicated from the controller 250 in the optical module 103 to a controller 260 in the host circuit 102 via a management interface such as the management interface path 106. The controller 260 in the host circuit 102 may be operable to control setting or configuration of each of the one or more host transmitter filters 201a-204a based on the determined signal quality. In this regard, the management interface such as the management interface path 106 may comprise, for example, a MDIO interface and/or an $I^2C$ interface. Each of the one or more host transmitter filters 201a-204a may comprise a pre-emphasis filter, for example.

In an exemplary embodiment of the invention, a limiter 301 in a signal quality monitor 240 in the optical module 103 may be operable to limit a signal 320 received from each of the one or more host transmitter filters 201a-204a such as the host transmitter filter 201a. The limited signal 330 and the signal 320 may be compared by a summer 302 in the signal quality monitor 240. An error 340 associated with the signal 320 may be generated by the summer 302 in the signal quality monitor 240 based on the comparison. The generated error 340 may be squared by a square block 303 in the signal quality monitor 240. A low pass filter 304 in the signal quality monitor 240 may be operable to generate a mean square error (MSE) 360 by low-pass filtering the squared error 350. In this regard, the controller 250 in the optical module 103 may determine the signal quality based on the generated mean square error (MSE) 360, for example.

The controller 260 in the host circuit 102 may also be operable to determine a signal quality associated with each of one or more module transmitter filters 221a-224a in the optical module 103. The determined signal quality associated with each of the one or more module transmitter filters 221a-224a may be communicated from the controller 260 in the host circuit 102 to the controller 250 in the optical module 106 via the management interface such as the management interface path 106. The controller 250 in the optical module 103 may be operable to control setting or configuration of each of the one or more module transmitter filters 221a-224a based on the determined signal quality associated with each of the one or more module transmitter filters 221a-224a. In this regard, each of the one or more module transmitter filters 221a-224a may comprise, for example, a de-emphasis filter. The signal quality associated with each of the one or more module transmitter filters 221a-224a may be determined by the controller 260 in the host circuit 102, based on a signal-to-noise ratio (SNR) associated with a signal received from each of the one or more module transmitter filters 221a-224a, for example.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for adaptively setting a transmitter filter for a high speed serial link transmitter.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising: in a communication device comprising a host circuit and an optical module, the host circuit comprises a first plurality of transmitters and a first plurality of receivers, the optical module comprises a second plurality of transmitters and a second plurality of receivers, and the host circuit and the optical module are communicatively coupled by a management interface connecting the host circuit to the optical module, an electrical transmit path connecting the first plurality of transmitters to the second plurality of receivers, and an electrical receive path connecting the second plurality of transmitters to the first plurality of receivers:
determining, in said optical module, a signal quality associated with individual host transmitter filters associated with the first plurality of transmitters in said host circuit;
communicating said determined signal quality from said optical module to said host circuit via the management interface; and
adjusting, in said host circuit, one or more settings of the individual host transmitter filters based on said determined signal quality.

2. The method according to claim 1, wherein said management interface comprises at least one of a management data input/output (MDIO) interface or an inter-integrated circuit ($I^2C$) interface.

3. The method according to claim 1, wherein the individual host transmitter filters comprise a pre-emphasis filter.

4. The method according to claim 1, comprising:
limiting, in said optical module, a signal received from the individual host transmitter filters;
comparing said limited signal with said signal; and
generating an error associated with said signal based on said comparison.

5. The method according to claim 4, comprising squaring, in said optical module, said generated error.

6. The method according to claim 5, comprising generating, in said optical module, a mean square error (MSE) by low-pass filtering said squared error.

7. The method according to claim 6, comprising determining, in said optical module, said signal quality based on said generated mean square error (MSE).

8. The method according to claim 1, comprising:
determining, in said host circuit, a signal quality associated with individual ones of a plurality of module transmitter filters associated with the second plurality of transmitters in said optical module;
communicating said determined signal quality associated with the individual ones of the module transmitter filters from said host circuit to said optical module, via said management interface; and
controlling, in said optical module, configuration of the individual ones of the module transmitter filters based on said determined signal quality associated with the individual ones of the module transmitter filters.

9. The method according to claim 8, comprising determining, in said host circuit, said signal quality associated with the individual ones of the module transmitter filters based on a signal-to-noise ratio (SNR) associated with a signal received from the individual ones of the module transmitter filters.

10. A system for communication, the system comprising: one or more processors, one or more circuits, or any combination thereof for use in a communication device, said communication device comprising a host circuit and an optical module, wherein the host circuit comprises a first plurality of transmitters and a first plurality of receivers, the optical module comprises a second plurality of transmitters and a second plurality of receivers, the host circuit and the optical module are communicatively coupled by:

- a management interface connecting the host circuit to the optical module;
- an electrical transmit path connecting the first plurality of transmitters to the second plurality of receivers; and
- an electrical receive path connecting the second plurality of transmitters to the first plurality of receivers; and
- said one or more processors, one or more circuits, or any combination thereof are operable to:
  - determine, in said optical module, a signal quality associated with individual host transmitter filters associated with the first plurality of transmitters in said host circuit;
  - communicate said determined signal quality from said optical module to said host circuit via the management interface; and
  - control, in said host circuit, configuration of the individual host transmitter filters based on said determined signal quality.

11. The system according to claim 10, wherein said management interface comprises at least one of a management data input/output (MDIO) interface or an inter-integrated circuit (I²C) interface.

12. The system according to claim 10, wherein the individual host transmitter filters comprise pre-emphasis filter.

13. The system according to claim 10, wherein said one or more processors, one or more circuits, or any combination thereof are further operable to:
- limit, in said optical module, a signal received from the individual host transmitter filters;
- compare said limited signal with said signal; and
- generate an error associated with said signal based on said comparison.

14. The system according to claim 13, wherein said one or more processors, one or more circuits, or any combination thereof are further operable to square, in said optical module, said generated error.

15. The system according to claim 14, wherein said one or more processors, one or more circuits, or any combination thereof are further operable to generate, in said optical module, a mean square error (MSE) by low-pass filtering said squared error.

16. The system according to claim 15, wherein said one or more processors, one or more circuits, or any combination thereof are further operable to determine, in said optical module, said signal quality based on said generated mean square error (MSE).

17. The system according to claim 10, wherein said one or more processors, one or more circuits, or any combination thereof are further operable to:
- determine, in said host circuit, a signal quality associated with individual ones of a plurality of module transmitter filters associated with the second plurality of transmitters in said optical module;
- communicate said determined signal quality associated with the individual ones of the module transmitter filters from said host circuit to said optical module, via said management interface; and
- control, in said optical module, configuration of the individual ones of the module transmitter filters based on said determined signal quality associated with the individual ones of the module transmitter filters.

18. The system according to claim 17, wherein the individual ones of the module transmitter filters comprise a de-emphasis filter.

19. The system according to claim 17, wherein said one or more processors, one or more circuits, or any combination thereof are further operable to determine, in said host circuit, said signal quality associated with the individual ones of the module transmitter filters based on a signal-to-noise ratio (SNR) associated with a signal received from the individual ones of the module transmitter filters.

20. A non-transitory computer readable medium having a program that, when executed by processing circuitry in a communication device comprising a host circuit and an optical module, wherein the host circuit comprises a first plurality of transmitters and a first plurality of receivers, the optical module comprises a second plurality of transmitters and a second plurality of receivers, and the host circuit and the optical module are communicatively coupled by a management interface connecting the host circuit to the optical module, an electrical transmit path connecting the first plurality of transmitters to the second plurality of receivers, and an electrical receive path connecting the second plurality of transmitters to the first plurality of receivers, causes the processing circuitry to:

- determine, in said optical module, a signal quality associated with individual host transmitter filters associated with the first plurality of transmitters in said host circuit;
- communicate said determined signal quality from said optical module to said host circuit via the management interface; and
- adjust, in said host circuit, one or more settings of the individual host transmitter filters based on said determined signal quality.

* * * * *